No. 774,774. PATENTED NOV. 15, 1904.
A. & J. H. McLEOD.
PACKAGING MACHINE.
APPLICATION FILED APR. 30, 1903. RENEWED APR. 15, 1904.
NO MODEL.
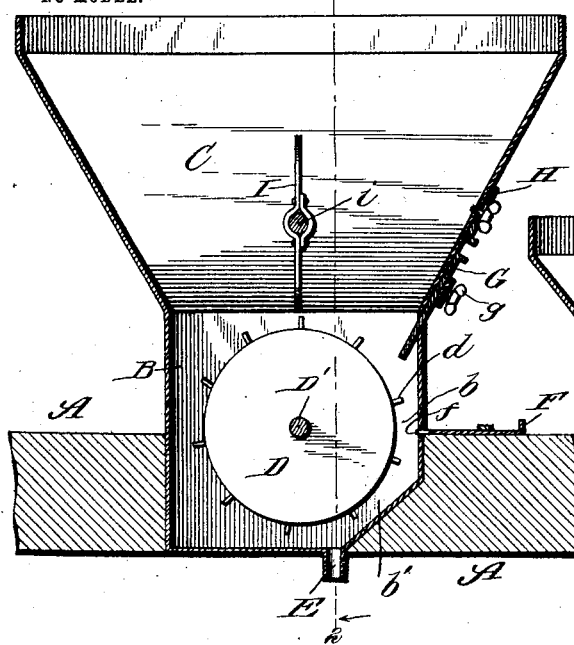
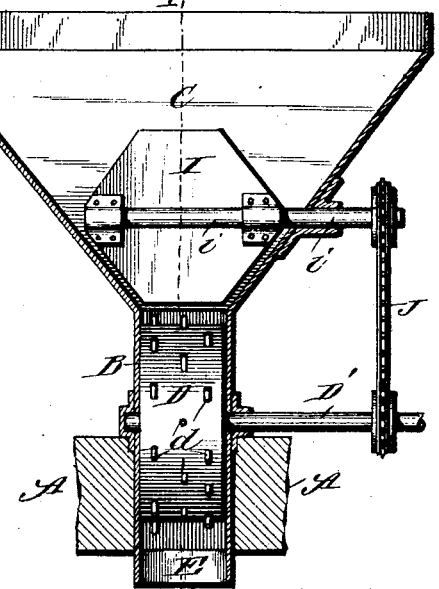
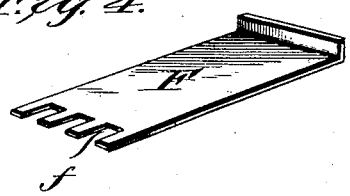
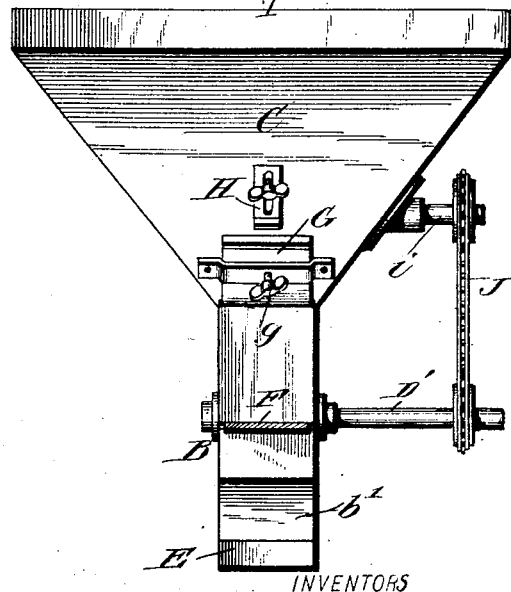
WITNESSES:
Fred. Bedford
Perry B. Turpin
INVENTORS
Angus McLeod.
John H. McLeod.
BY Munn & Co.
ATTORNEYS.

No. 774,774.

UNITED STATES PATENT OFFICE.

ANGUS McLEOD AND JOHN H. McLEOD, OF MARIETTA, KANSAS.

PACKAGING-MACHINE.

SPECIFICATION forming part of Letters Patent No. 774,774, dated November 15, 1904.

Application filed April 30, 1903. Renewed April 15, 1904. Serial No. 203,352. (No model.)

*To all whom it may concern:*

Be it known that we, ANGUS McLEOD and JOHN H. McLEOD, citizens of the United States, residing at Marietta, in the county of Marshall and State of Kansas, have made certain new and useful Improvements in Packaging-Machines, of which the following is a specification.

This invention is an improvement in packaging-machines, and especially in force-feed devices for flaked or powdered material; and the invention consists in certain novel constructions and combinations of parts, as will be hereinafter described and claimed.

In the drawings, Figure 1 is a vertical longitudinal section on about line 1 1 of Fig. 2. Fig. 2 is a cross-section on about line 2 2 of Fig. 1. Fig. 3 is a front elevation of the feed apparatus, and Fig. 4 is a detail perspective view of the cut-off.

On the table or base A is mounted the discharge-chamber B, upon which is mounted the hopper C, the hopper discharging to the chamber B, as shown in Figs. 1 and 2. The feed-roller D is journaled at D' and operates within the chamber B and is provided on its periphery with the outwardly-projecting pins d, which operate to discharge the flaked, granular, or powdered material in the operation of the invention. The discharge-spout E is arranged at the bottom of the chamber B and beneath the roller D—that is to say, not in line with the feed side of the said roller, but slightly under the roller, so as to check the force of the material before it discharges from the spout E and enters the weighing devices. (Not shown.) The purpose of this is to prevent the force of the discharge of the material from the spout E from affecting the weighing operations. The weighing devices may be of any ordinary construction, and it does not seem necessary to illustrate the same herein.

A cut-off slide F is mounted on the table and may be adjusted across the throat b of the discharge-chamber B, such slide F being notched at one end at f to permit the passage of the pins d in the operation of the invention. A feed-regulating slide G is movable across the upper portion of the throat b and may be clamped in any adjustment by the screw g, a gage-plate H being supported adjustably upon the front of the hopper to form a stop for the feed-slide and to indicate the point to which said slide should be adjusted for any particular purpose.

The feed-roller D may be revolved in any suitable manner, and when we employ the agitator I within the hopper C it is preferred to gear the shaft i of said agitator with the shaft D' of the feed-roller by means of the sprocket-pulleys and chain J, as shown in Figs. 2 and 3. This agitator I will be found useful in handling powdered goods—such as baking-powder, borax, and the like—but will not ordinarily be found necessary in handling flaked goods, such as rolled oats, for which the present invention is especially adapted and in handling which the machine has proved very satisfactory.

As before suggested, the discharge-spout E is arranged or set to one side of the face of the roller and is thus brought out of line with the vertical portion of the throat b, an inclined surface b' extending between the vertical portion of the throat B and the spout E, as shown in Fig. 1 of the drawings.

Having thus described our invention, what we claim as new, and desire to secure by Letters Patent, is—

1. The improvement in packaging-machines herein described, comprising the hopper, the discharge-chamber below the hopper and provided at one side with the throat for the material and with an inclined face connecting the vertical portion of said throat with the discharge-spout, the discharge-spout being arranged at the lower end of the discharge-chamber, the feed-roller journaled in the discharge-chamber, and above the feed-spout, the latter being to one side of the feed-face of the said roller, the pins projecting from the periphery of the roller, the agitator operating in the hopper and geared with the feed-roller, the cut-off slide adjustable across the throat of the discharge-chamber, the feed-regulating slide, and the gage-plate for said slide, substantially as set forth.

2. The combination with the hopper, and the feed-roller, of the discharge-chamber having the feed-throat to one side of the roller, and having an upright portion, the discharge-spout below the roller and out of line with the upright portion of the feed-throat, and the cut-off and regulating slides crossing the feed-throat, substantially as set forth.

ANGUS McLEOD.
JOHN H. McLEOD.

Witnesses:
P. G. WADHAM,
KATHERINE FUNCK.